(12) United States Patent
Wang et al.

(10) Patent No.: US 9,560,612 B2
(45) Date of Patent: Jan. 31, 2017

(54) DATA SYNCHRONIZATION METHOD AND SYSTEM

(75) Inventors: Hong Wang, Beijing (CN); Huarui Liang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/379,502

(22) PCT Filed: Jun. 18, 2010

(86) PCT No.: PCT/KR2010/003933
§ 371 (c)(1),
(2), (4) Date: Dec. 20, 2011

(87) PCT Pub. No.: WO2010/151003
PCT Pub. Date: Dec. 29, 2010

(65) Prior Publication Data
US 2012/0099511 A1    Apr. 26, 2012

(30) Foreign Application Priority Data

Jun. 23, 2009  (CN) .......................... 2009 1 0150448

(51) Int. Cl.
*H04W 56/00* (2009.01)
*H04L 12/26* (2006.01)
*H04L 12/18* (2006.01)
*H04W 28/16* (2009.01)
(Continued)

(52) U.S. Cl.
CPC .......... *H04W 56/001* (2013.01); *H04L 43/10* (2013.01); *H04W 56/0065* (2013.01); *H04L 12/189* (2013.01); *H04W 4/06* (2013.01); *H04W 28/16* (2013.01); *H04W 76/002* (2013.01)

(58) Field of Classification Search
CPC .......... H04W 56/001; H04W 56/0065; H04W 76/002; H04W 28/16; H04W 4/06; H04L 43/10; H04L 12/189
See application file for complete search history.

(56) References Cited

U.S. PATENT DOCUMENTS

| 2005/0058090 | A1 | 3/2005 | Chang et al. |
| 2006/0045020 | A1 | 3/2006 | Picco et al. |
| 2007/0025481 | A1 | 2/2007 | Ryu et al. |

(Continued)

FOREIGN PATENT DOCUMENTS

| CN | 101171789 A | 4/2008 |
| CN | 101242552 A | 8/2008 |
| CN | 101394293 A | 3/2009 |

*Primary Examiner* — Joshua Kading
(74) *Attorney, Agent, or Firm* — Jefferson IP Law, LLP

(57) ABSTRACT

The present invention discloses a data synchronization method and system. The method includes that: a first device adds a time stamp to a received data packet and transmits the data packet to a second device; the second device determines a transmission period to which the data packet belongs according to the time stamp of the data packet, and transmits data packets of different services which belong to the same transmission period by using air resources corresponding to the transmission period after the data packets of the different services which belong to the same transmission period are multiplexed. By the technical scheme of the present invention, air resources can be fully utilized.

8 Claims, 9 Drawing Sheets

(51) Int. Cl.
*H04W 4/06* (2009.01)
*H04W 76/00* (2009.01)

(56) References Cited

U.S. PATENT DOCUMENTS

| | | |
|---|---|---|
| 2008/0075052 A1 | 3/2008 | Yang et al. |
| 2008/0101334 A1* | 5/2008 | Bakker et al. ............... 370/350 |
| 2009/0147877 A1* | 6/2009 | Connors et al. ............. 375/267 |
| 2010/0110958 A1* | 5/2010 | Racz et al. ................... 370/312 |
| 2010/0195558 A1* | 8/2010 | Koskinen ...................... 370/312 |
| 2011/0044225 A1* | 2/2011 | Rinne et al. .................. 370/312 |
| 2011/0268018 A1* | 11/2011 | Wang et al. .................. 370/328 |

* cited by examiner

DATA SYNCHRONIZATION METHOD AND SYSTEM

TECHNICAL FIELD

The present invention relates to data communication technologies, and more particularly to a data synchronization method and system.

BACKGROUND ART

With the development of communication technologies, a mobile communication system has been evolved into a System Architecture Evolution (SAE) system. The SAE system includes an Evolved Universal Terrestrial Radio Access Network (E-UTRAN), and the E-UTRAN includes a core network and a wireless access network.

FIG. 1 is schematic diagram illustrating an E-UTRAN in a SAE system in the prior art. As shown in FIG. 1, an evolved Node B (eNB) belongs to the wireless access network, and the core network includes a Mobility Management Entity (MME) and a Subscriber Gateway (S-GW). The eNB is adapted to provide a wireless interface for User Equipment (UE) such as a handset and so on. The MME is adapted to manage mobility contexts and session contexts of the UE, and issue information related to security to a user through packets. The S-GW is adapted to provide functions of a subscriber plane. The MME and the S-GW may be in the same physical entity. Generally, the S-GW transmits user data streams through a GPRS Tunneling Protocol (GTP) to the eNB to which the UE belongs, and then the eNB transmits the user data streams to the UE. Each eNB is connected with multiple MMEs in an MME pool, and also is connected with multiple S-GWs in an S-GW pool. An interface between eNBs is called as an X2 interface, and an interface between the eNB and the MME or between the eNB and the S-GW is called as an S1 interface.

In order to effectively utilize air interface resources, some mobile communication services are provided to users in a broadcast and multicast mode, and these mobile communication services are called as Multimedia Broadcast and Multicast Services (MBMS). Each MBMS is provided in its own serving area, and in each cell of the serving area, a special control channel is used to transmit MBMS signallings. A Broadcast Multicast Service Center (BM-SC) is a multimedia broadcast and multicast service providing center, MBMS data are transmitted from the BM-SC to the S-GW in a SAE network, then are transmitted to a corresponding eNB by the S-GW, and finally are transmitted to a user by the eNB.

The MBMS service may be transmitted in a single carrier cell, and id different cells use different carriers, a user on the boundary of a cell only receives the MBMS service of the current cell. If adjacent cells use the same carrier to transmit the same MBMS service, and transmit the MBMS service in a synchronization mode, the user on the boundaries of the adjacent cells can receive a signal obtained by overlapping energies of the two MBMS services. Therefore, in the prior art, a continuous area is defined. In this area, all eNBs use the same carrier to synchronously transmit the same MBMS signal, to improve the receiving quality of the user's MBMS service. The continuous area is called as a Single Frequency Network (SFN) area.

The SFN area includes a group of cells which are continuous geographically, and the cells use the same radio resources to synchronously transmit a specific MBMS service. The SFN area exclusively belongs to one MBMS serving area.

The performance can be improved obviously through synchronously transmitting MBMS data by all eNBs in the SFN area. At present, different technologies may be used to implement the data synchronization transmission between eNBs. In one technology, a network provides synchronization, i.e. a transmission network obtains synchronization through clocks. In this technology, an IEEE1588 protocol may be used, to coordinate clocks of all eNBs and make these clocks synchronous, and the accuracy of these clocks is in a microsecond level. In another technology, a synchronization signal is transmitted to each eNB through a common satellite signal, e.g. a Global Position System (GPS). No matter which technology is used, the object is to make all eNBs synchronously transmit signals, to implement the overlapping of signals of different eNBs, thereby improving signal quality.

When MBMS data are transmitted from the BM-SC to each eNB, it is possible that data packets are lost or lagged, so it is needed to provide some mechanisms to guarantee that data transmitted by all eNBs can keep synchronous even if the data packets are lost or lagged.

A conventional mode includes that the BM-SC adds a synchronization frame head into a MBMS data packet, and the synchronization frame head mainly includes a time stamp and two counters. The time stamp is used to indicate absolution time in one synchronization period, one counter is used to indicate an Elapsed Octet Counter transmitted in one synchronization period, and the other counter is used to indicate a Packet Number in one synchronization period. The two counters are set as 0 at the beginning of each synchronization period.

MBMS data packets may be lost when being transmitted from the BM-SC to the eNB, and the eNB determines how many data packets and bytes are lost during the transmission procedure according to the Elapsed Octet Counter and the Packet Number in the synchronization frame head. The eNB needs to determine how many radio resources are occupied by the lost data packets, and fills filling bits of which quantity is the same as the quantity of the lost data packets on the radio resources. A simple example is taken hereinafter to describe how the eNB calculates the lost data.

For example, the eNB1 has received a first packet, the Packet Number of the first packet is equal to 1, and the Elapsed Octet Counter of the first packet is 50 bytes; the eNB1 receives a second packet again, the Packet Number of the second packet is 3, and the Elapsed Octet Counter of the second packet is 100 bytes; the eNB may determine that one packet is lost, the Packet Number of the lost packet is 2, and the Elapsed Octet Counter of the lost packet is 50 bytes; and thus the eNB1 needs to reserve air resources of 50 bytes on which any data can not be transmitted or predefined filling bits are transmitted. Another eNBx receiving the packet of which Packet Number is 2 transmits the packet normally. In this way, it can be guaranteed that the eNB1 and the eNBx can transmit the packet of which Packet Number is 3 by using the same air resources.

The time stamp is used to indicate absolution time, to tell the eNB when data are transmitted. According to a definition, the absolution time indicated by the time stamp is multiples of 10 ms.

In the prior art, time stamps of data packets of the same service are identical in each synchronization period of the BM-SC, and are calculated according to time at which the BM-SC receives the first data packet of the service in the synchronization period, a calculating formula is as follows:

> time stamp=time at which the BM-SC receives the first data packet+the length of the synchronization period+a delay.

The delay relates to the largest transmission delay and a processing time. The length of the synchronization period and the delay are configured by an operating and maintaining system. The change of the time stamp means the start of a new synchronization period.

After receiving a data packet, the eNB determines, according to the time stamp, the time at which the data packet is transmitted. The eNB caches, multiplexes and transmits data in one transmission period, and this time period is called as a MCH Subframe Allocation Pattern (MSAP) time period. Generally, the length of the MSAP time period is the same as the length of the synchronization period on the BM-SC, but on the eNB, the time period is called as the MSAP time period or a transmission period. The MSAP time period corresponds to certain physical resources. The physical resources are composed of subframes with a certain format. The subframes do not need to be continuous in time, and the format is called as MSAP. The eNB provides dispatching information to the UE, and the dispatching information relates to one MSAP time period. The dispatching information is used to tell the UE which MBMS service is received on which subframe.

FIG. 2 is a schematic diagram illustrating an implementation in which data packets of the same service are transmitted in the same synchronization period in the prior art. Suppose that the length of a synchronization period is 60 ms, the delay is 10 ms, and at 10:00:00:000, the BM-SC receives the first data packet of a service 1, called as a data packet 1 of the service 1, a time stamp added to the data packet 1 by the BM-SC is 10:00:00:000 (hour:minute:second:microsecond)+the length of the synchronization period+the delay=10:00:00:000+70 ms. After 10 ms, the BM-SC receives the second data packet of the service 1, called as a data packet 2 of the service 1, and the same time stamp of 10:00:00:000+70 ms is added to the data packet 2 because the data packet 2 and the data packet 1 are transmitted in the same synchronization period. The eNB has its own clock, and air resources corresponding to 10:00:00:000+70 ms are a radio time slot 1, so the data packet 1 of the service 1 should be transmitted at the time corresponding to the radio time slot 1, and the data packet 2 of the service 1 should be transmitted following the data packet 1.

FIG. 3 is a schematic diagram illustrating an implementation in which data packets of different services are transmitted in the same synchronization period in the prior art. Suppose that the length of a synchronization period is 60 ms, the delay is 10 ms, and at 10:00:00:000, the BM-SC receives a data packet 1 of a service 1, a time stamp added to the data packet 1 by the BM-SC is 10:00:00:000+70 ms. After 10 ms, the BM-SC receives a data packet 1 of a service 2, and a time stamp added to the data packet 1 of the service 2 is 10:00:00:010+70 ms=10:00:00:000+80 ms. For the eNB, air resources corresponding to 10:00:00:000+70 ms are a radio time slot 1, so the data packet 1 of the service 1 should be transmitted at the time corresponding to the radio time slot 1; air resources corresponding to 10:00:00:000+80 ms are a radio time slot 2, so the data packet 1 of the service 2 should be transmitted at the time corresponding to the radio time slot 2. If the data packet 1 of the service 1 is very large and the transmission of the data packet 1 is not be completed in the radio time slot 1, the data packet 1 of the service 2 can not be transmitted in the radio time slot 2 and needs to be delayed. Vice verse, as shown in FIG. 4, if the data packet 1 of the service 1 is very small and only a small amount of data are transmitted in the radio time slot 1, the air resources can not be fully utilized, which results in waste. FIG. 4 is a schematic diagram illustrating another implementation in which data packets of different services are transmitted in the same synchronization period in the prior art.

Sum up, in the conventional data synchronization method, air resources can not be fully utilized.

DISCLOSURE OF INVENTION

Technical Problem

The object of the present invention is providing a data synchronization method, in which air resources can be fully utilized.

The other object of the present invention is providing a data synchronization system, in which air resources can be fully utilized.

Solution to Problem

In order to achieve the above object, technical schemes of the present invention are implemented as follows.

The present invention provides a data synchronization method, applied to a scene in which a first device transmits a received data packet to multiple second devices, and the multiple second devices synchronously transmit a received same data packet, and the method includes:

adding, by the first device, a time stamp to the received data packet, and transmitting the data packet to the second device; and determining, by the second device, a transmission period to which the data packet belongs according to the time stamp of the data packet, and transmitting data packets of different services which belong to a same transmission period by using air resources corresponding to the transmission period after the data packets of the different services which belong to the same transmission period are multiplexed.

The present invention provides a data synchronization system, which includes a first device and multiple second devices; the first device transmits a received data packet to multiple second devices, and the multiple second devices synchronously transmit a received same data packet; where the first device, adapted to add a time stamp to the received data packet, and transmit the data packet to the second device; and the second device, adapted to determine a transmission period to which the data packet belongs according to the time stamp of the data packet, and transmit data packets of different services which belong to a same transmission period by using air resources corresponding to the transmission period after the data packets of the different services which belong to the same transmission period are multiplexed.

As can be seen from the above technical schemes that, in the present invention, the first device adds a time stamp to a received data packet and transmits the data packet to the second device; the second device determines a transmission period to which the data packet belongs according to the time stamp of the data packet, and transmits data packets of different services which belong to the same transmission period on air resources corresponding to the transmission period after the data packets of the different services which belong to the same transmission period are multiplexed according to a predefined strategy. In this way, air resources can be fully utilized.

Advantageous Effects of Invention

According to the present invention, the first device adds a time stamp to a received data packet and transmits the data packet to the second device; the second device determines a transmission period to which the data packet belongs according to the time stamp of the data packet, and transmits data packets of different services which belong to the same transmission period by using air resources corresponding to the transmission period after the data packets of different services which belong to the same transmission period are multiplexed according to a predefined strategy. In this way, air resources can be fully utilized.

MODE FOR THE INVENTION

Figure 1:
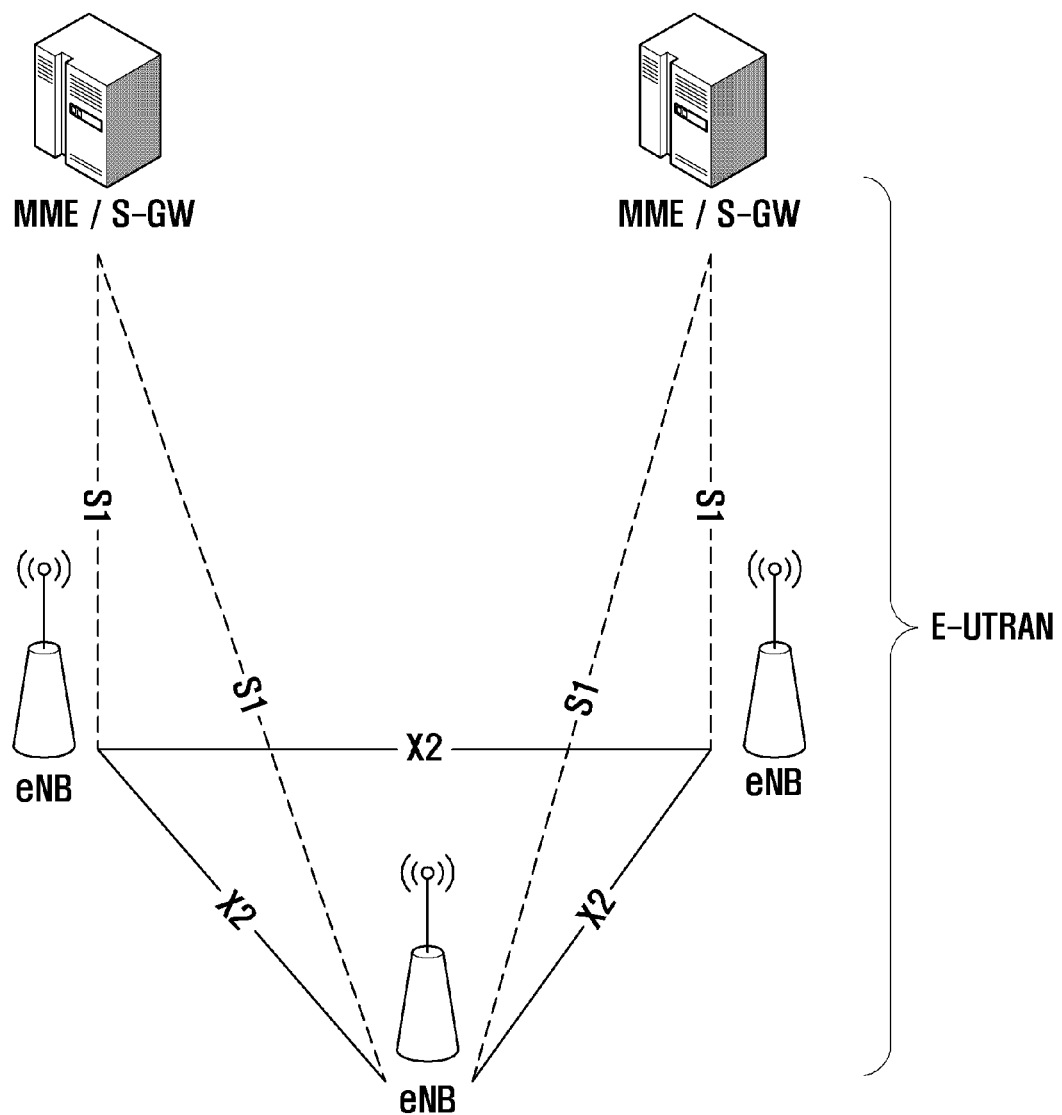
FIG. 1 is schematic diagram illustrating an E-UTRAN in a SAE system in the prior art.
Figure 2:
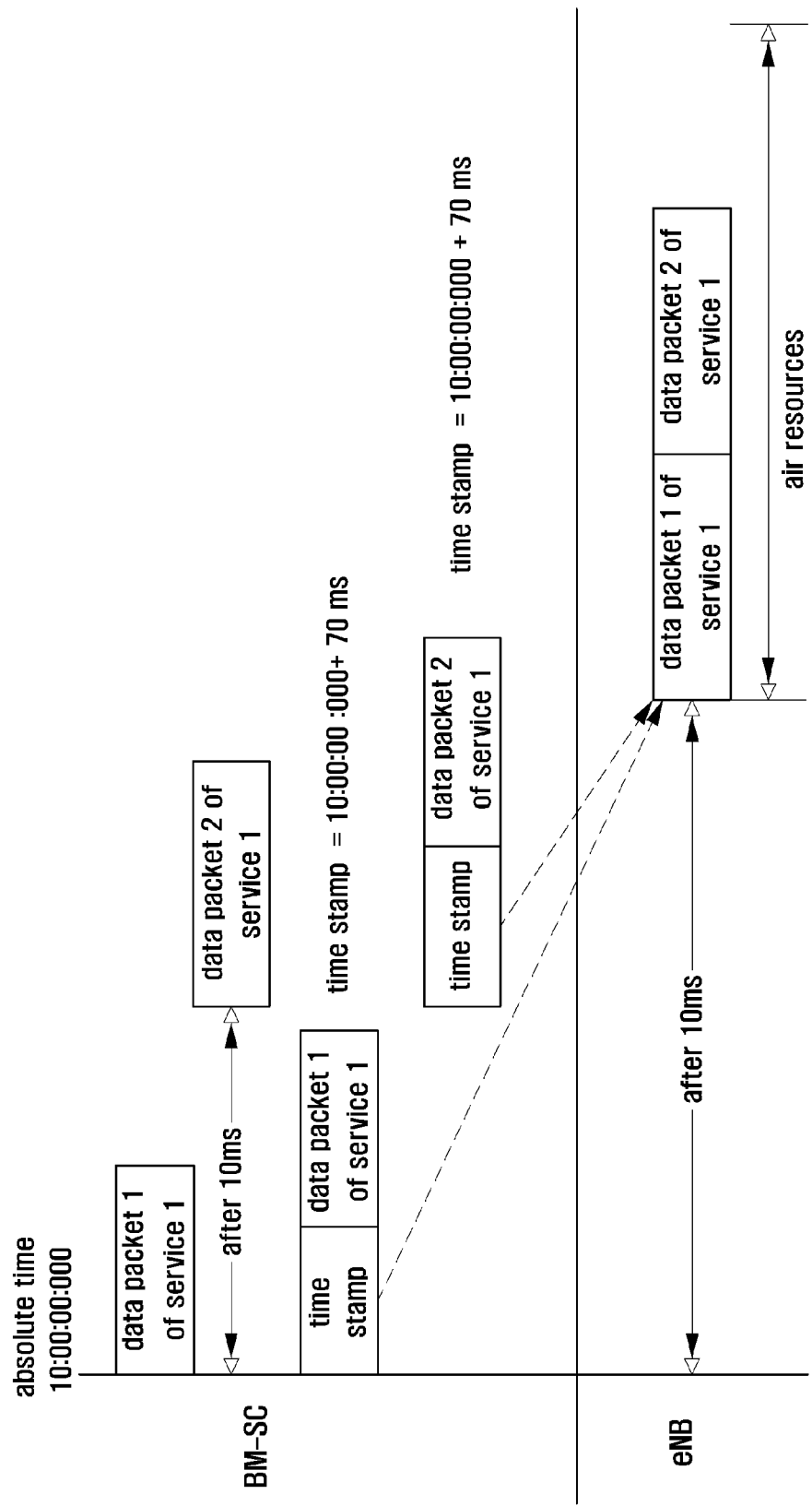
FIG. 2 is a schematic diagram illustrating an implementation in which data packets of the same service are transmitted in the same synchronization period in the prior art.
Figure 3:
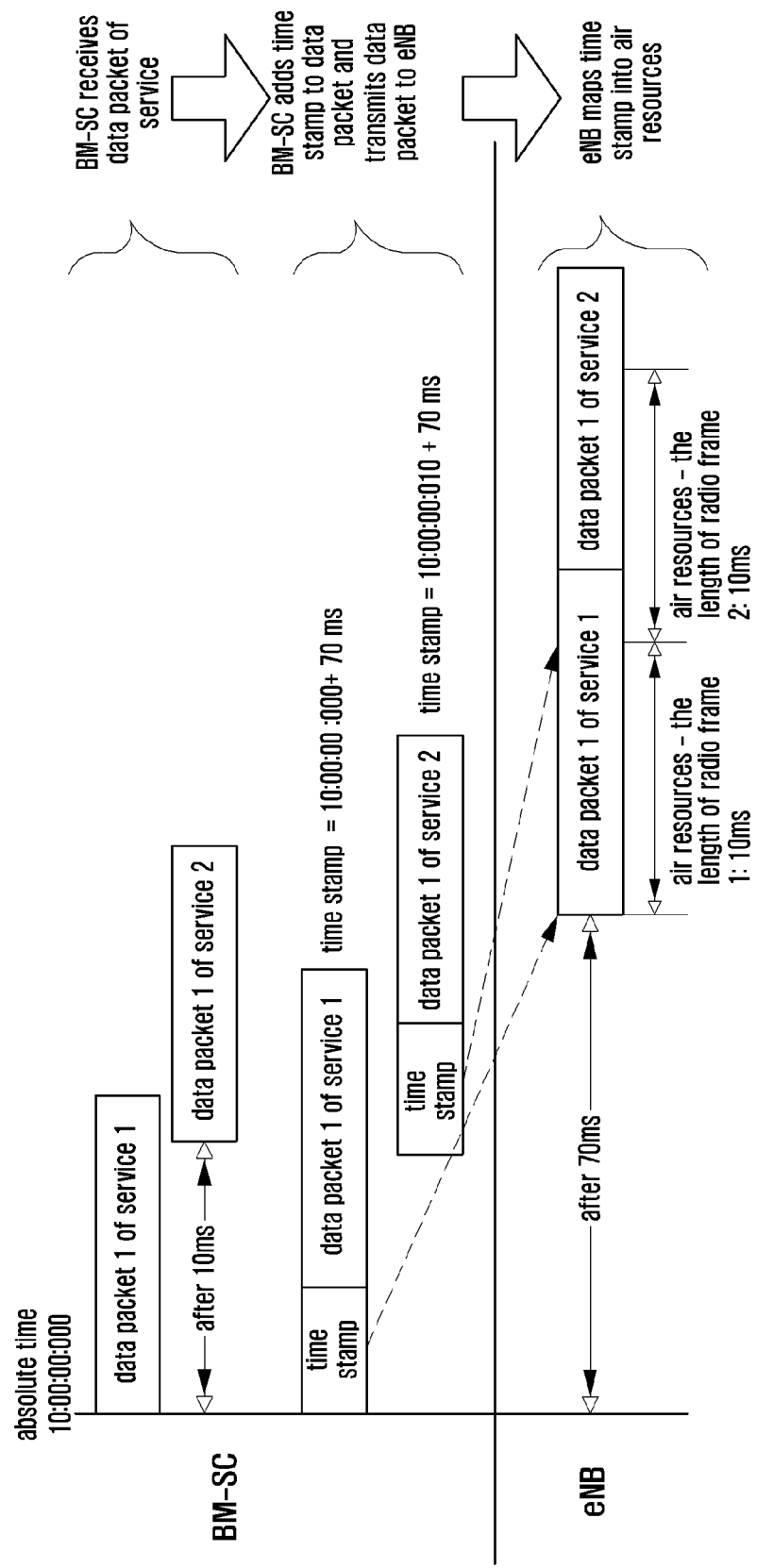
FIG. 3 is a schematic diagram illustrating an implementation in which data packets of different services are transmitted in the same synchronization period in the prior art.
Figure 4:
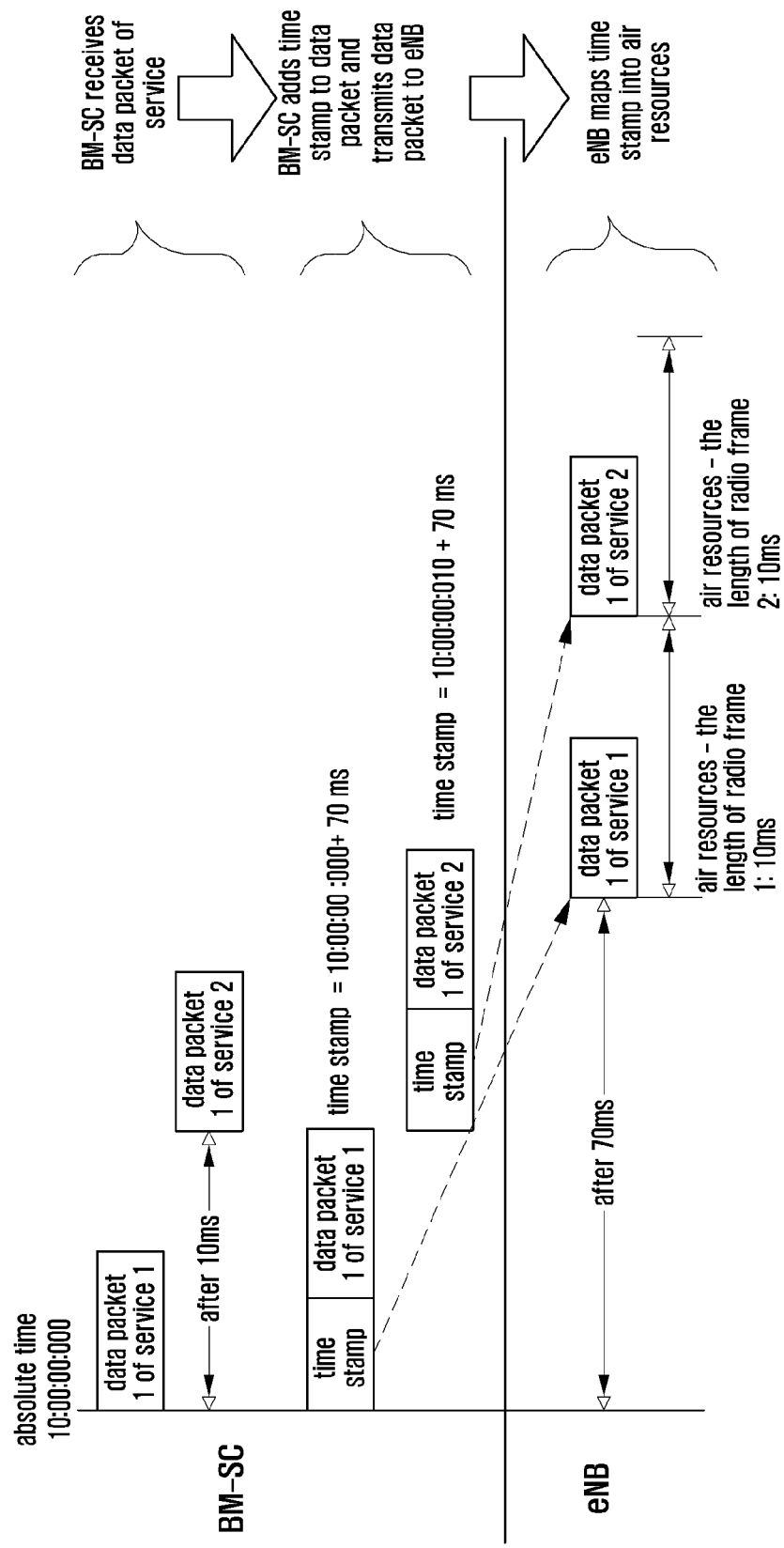
FIG. 4 is a schematic diagram illustrating another implementation in which data packets of different services are transmitted in the same synchronization period in the prior art.
Figure 5:
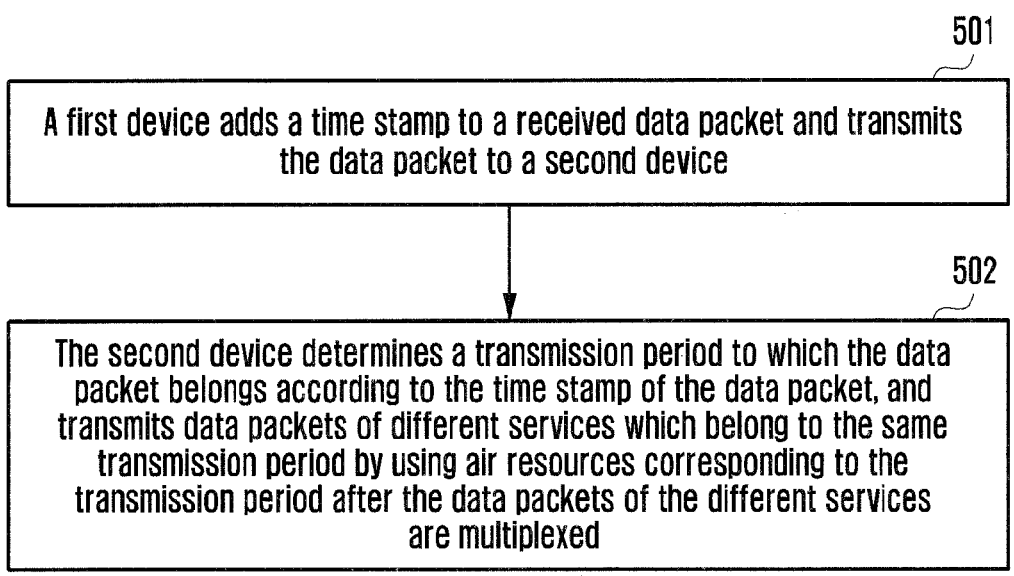
FIG. 5 is a flowchart illustrating a data synchronization method according to an embodiment of the present invention.

FIG. 5 is a flowchart illustrating a data synchronization method according to an embodiment of the present invention. The method is applied to a scene in which a first device transmits a received data packet to multiple second devices, and the second devices synchronously transmit the same data packet. For example, in the scene mentioned in the Background of the Invention, the BM-SC transmits the received MBMS service data packet to multiple eNBs in the SFN, and the eNBs in the SFN synchronously transmit the same MBMS service data packet. As shown in FIG. 5, the method includes:

Step 501: The first device adds a time stamp to a received data packet, and transmits the data packet to the second device.

Step 502: The second device determines a transmission period to which the data packet belongs according to the time stamp of the data packet, and transmits data packets of different services which belong to the same transmission period by using air resources corresponding to the transmission period after the data packets of the different services which belong to the same transmission period are multiplexed.

In this step, all second devices multiplex data packets in the same transmission period by using the same predefined strategy.

By using the method shown in FIG. 5, the second devices can fully utilize air resources to synchronously transmit the data packets.

In the method as shown in FIG. 5, the data packets transmitted from the first device to the second device may be lost, so a synchronization frame head added into the data packets by the first device includes an Elapsed Octet Counter and a Packet Number except a time stamp. In this way, the second device may calculate the lost data packets according to the Elapsed Octet Counter and the Packet Number, and reserve air resources for the lost data packets on which any data packet can not be transmitted or filling bits are transmitted. This implementation is the same as that in the prior art, and will not be described in detail in the embodiments of the present invention.

In the method as shown in FIG. 5, key technologies include that the first device adds which time stamp to the data packet, so that the second device can determine the transmission period to which the data packet belongs according to the time stamp, which will be described hereinafter in detail.

The following embodiments are described by taking an example of an MBMS service scene, i.e. the BM-SC transmits received data packets to multiple eNBs in the SFN, and the eNBs in the SFN need to synchronously transmit the same MBMS service data packet, to achieve an advantage of combining gains.

A First Embodiment

An operating and maintaining system configures parameters for a BM-SC, which include the length of a synchronization period, a serial number of the synchronization period and the start time of the synchronization period. Similarly, an eNB also configures the length of a transmission period, a serial number of the transmission period and the start time of the transmission period. Because of the largest transmission delay and the largest processing delay from the BM-SC to the eNB, the start time of the synchronization period on the BM-SC and the start time of the transmission period on the eNB which have the same serial number are different, and the start time of the transmission period on the eNB is lagged for a period of time. For example, if the start time of a synchronization period with a serial number of 0 is 10:00:00:000 on the BM-SC, the start time of a transmission period with a serial number of 0 is 10:00:00:650 on the eNB, and is lagged for 650 ms. Here, the lagged time may be determined according to an actual transmission delay and a processing delay, or may be determined according to the length of the synchronization period and a delay time. In this embodiment, the length and serial number range of the synchronization period on the BM-SC and the length and serial number range of the transmission period on the eNB are preconfigured, the BM-SC and the eNB use the same configuration, when the synchronization/transmission period of the largest serial number comes, the serial number of the synchronization/transmission period needs to be reconfigured as the serial number of the first synchronization/transmission period, circulated as such. For example, in this embodiment, the length of the synchronization period is configured as 640 ms on the BM-SC, and the serial number range of the synchronization period is 0-99; the length of the transmission period is configured as 640 ms on the eNB, and the serial number range of the transmission period is 0-99. The configuration of the time stamp and the transmission of the data packets in this embodiment are shown in FIG. 6.

Figure 6:
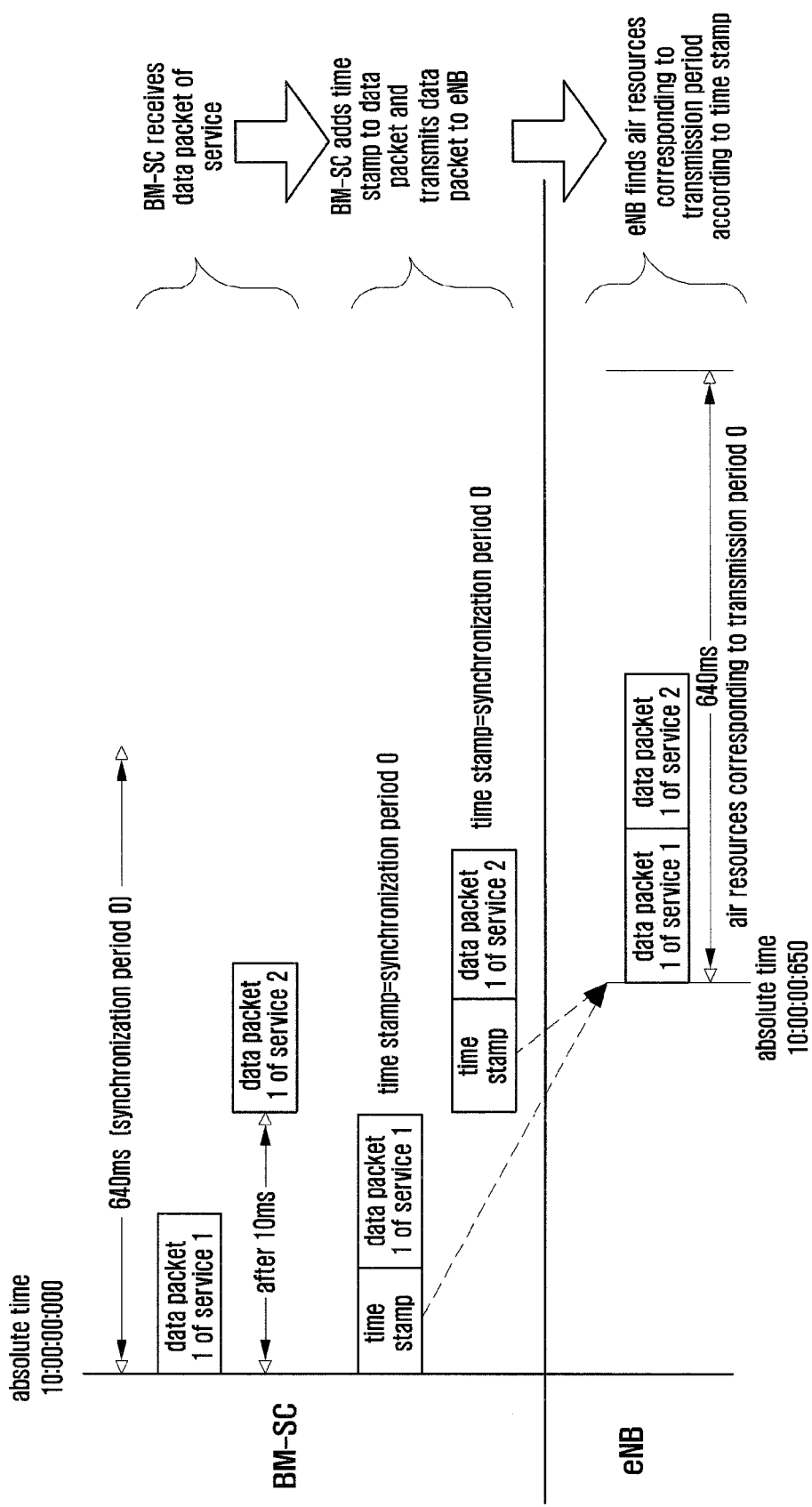
FIG. 6 is a schematic diagram illustrating data packet transmission according to a first embodiment of the present invention.

FIG. 6 is a schematic diagram illustrating data packet transmission according to a first embodiment of the present invention. As shown in FIG. 6, a synchronization period 0 starts from absolution time 10:00:00:000, and the BM-SC receives the first data packet of a service 1 at the absolution time 10:00:00:000, called as a data packet 1 of the service 1. A time stamp added to the data packet 1 of the service 1 by the BM-SC is a serial number of the current synchronization period, i.e. a synchronization period 0. After 10 ms, the BM-SC receives the first data packet of a service 2, called as a data packet 1 of the service 2. Because the BM-SC receives the data packet 1 of the service 2 in the synchronization period 0, a time stamp added to the data packet 1 of the service 2 by the BM-SC is the synchronization period 0. In other words, in this embodiment, the BM-SC adds the same time stamp to all data packets received in the same synchronization period, and the time stamp is a serial number of the current synchronization period.

Referring to FIG. 6, when the eNB receives the data packet 1 of the service 1 and the data packet 1 of the service 2, because the data packet 1 of the service 1 and the data packet 1 of the service 2 have the same time stamp, it is determined that the data packet 1 of the service 1 and the data packet 1 of the service 2 need to be transmitted in the same transmission period with the serial number of 0. Of cause, the number of the data packets transmitted in the synchronization period 0 by the BM-SC may exceed 2 shown in FIG. 6, so FIG. 6 only shows an example. The eNB multiplexes all data packets in the transmission period 0 according to a predefined strategy. For example, data packets of the service 1 are transmitted firstly, and then data packets of the service 2 are transmitted; or the data packets of the service 1 and the data packets of the service 2 are transmitted by turns. The eNB transmits the multiplexed data on air resources corresponding to the transmission period 0.

In each embodiment of the present invention, the multiplexing strategies of the eNBs in the same SFN are the same.

A Second Embodiment

An operating and maintaining system configures parameters for a BM-SC, which include the length of a synchronization period and a transmission delay. In this embodiment, the length of the synchronization period is 640 ms, and the transmission delay is 10 ms.

The BM-SC adds the same time stamp to all data packets of the same service received in one synchronization period; or the BM-SC adds the same time stamp to all data packets received in one synchronization period, no matter whether the data packets belong to the same service. The time stamp is different from the serial number of the synchronization period, but is absolution time.

If the BM-SC adds the same time stamp to all received data packets of the same service in one synchronization period, the time stamp added by the BM-SC to data packets of a certain service received in one synchronization period is represented by the following formula:

time stamp=absolution time at which the MB-SC receives the first data packet of the service in the synchronization period+(or −) a fixed value.

If the BM-SC adds the same time stamp to all data packets received in one synchronization period, no matter whether the data packets belong to the same service, the time stamp added by the BM-SC to the data packets received in one synchronization period is represented by the following formula:

time stamp=absolution time at which the MB-SC receives the first data packet in the synchronization period+(or −) a fixed value;

or time stamp=absolution time at which the synchronization period starts+(or −) a fixed value;

the fixed value is 0, or the length of the synchronization period, or the length of a delay time, or the length of the synchronization period plus the length of the delay time.

If the time stamp is configured as absolution time at which the synchronization period starts plus or minus a fixed value, the BM-SC needs to configure the start time of the synchronization period, i.e. the BM-SC needs to learn the start time of each synchronization period.

Figure 7:
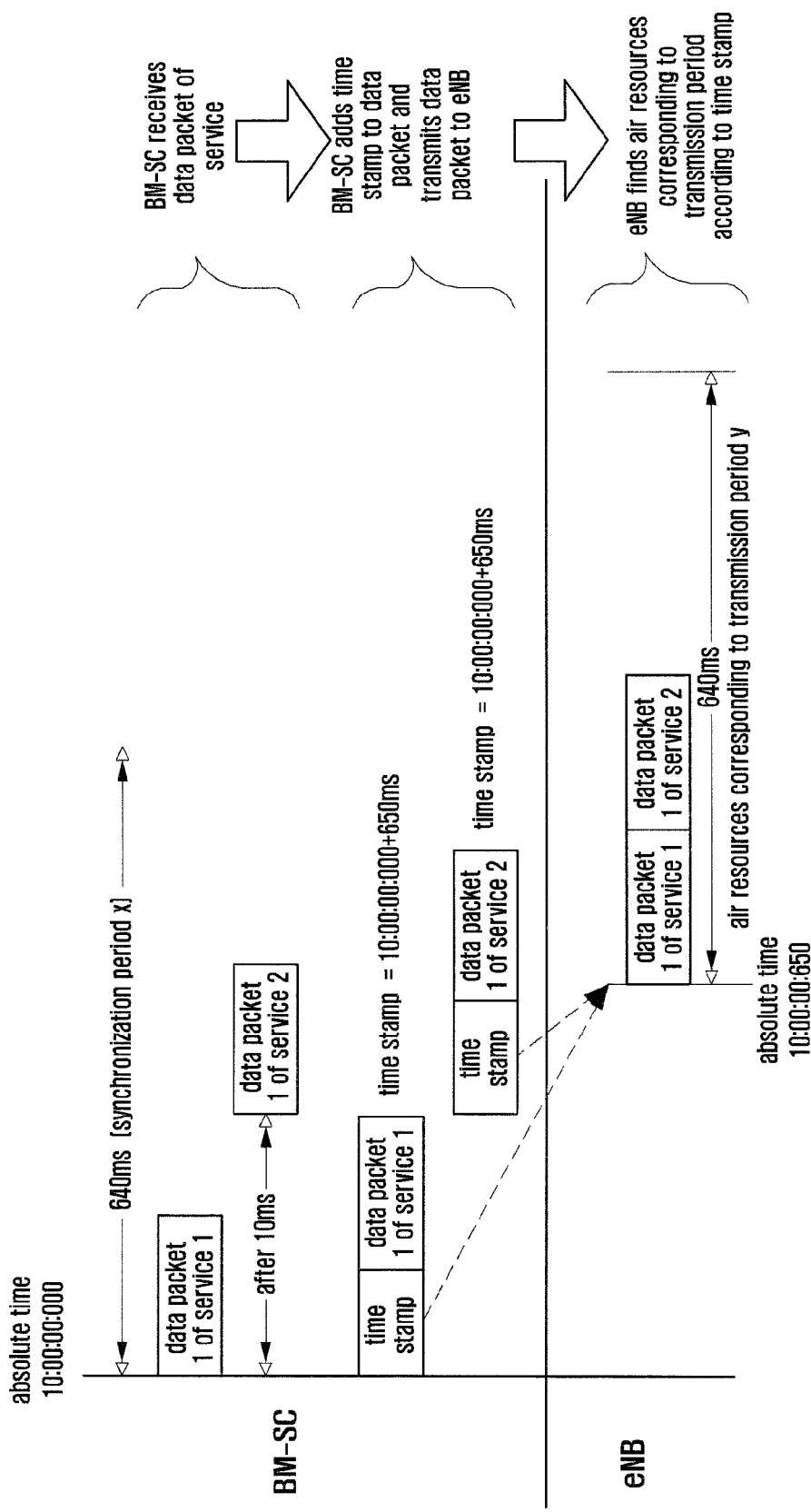
FIG. 7 is a schematic diagram illustrating data packet transmission according to a second embodiment of the present invention.

FIG. 7 is a schematic diagram illustrating data packet transmission according to a second embodiment of the present invention. This embodiment is described by taking an example that the BM-SC adds the same time stamp to all data packets received in one synchronization period, no matter whether the data packets belong to the same service, and the time stamp is absolution time at which the MB-SC receives the first data packet in the synchronization period plus the length of the synchronization period and the length of the delay time. As shown in FIG. 7, a synchronization period x on the BM-SC starts from absolution time 10:00:00:000, and at the absolution time 10:00:00:000, the BM-SC receives the first data packet of a service 1, called as a data packet 1 of the service 1. The time stamp added to the data packet 1 of the service 1 by the BM-SC is 0:00:00:000+650 ms. After 10 ms, the BM-SC receives the first data packet of a service 2, called as a data packet 1 of the service 2. Because the BM-SC receives the data packet 1 of the service 2 in the synchronization period x, a time stamp added to the data packet 1 of the service 2 by the BM-SC also is 0:00:00:000+650 ms.

Referring to FIG. 7, when the eNB receives the data packet 1 of the service 1 and the data packet 1 of the service 2, because the data packet 1 of the service 1 and the data packet 1 of the service 2 have the same time stamp, it is determined that the data packet 1 of the service 1 and the data packet 1 of the service 2 need to be transmitted in the same transmission period. The eNB makes the absolution time of the time stamp correspond to its own transmission period, for example, the time indicated by the time stamp is from 10:00:00:640 to 10:00:01:280, which corresponds to the transmission period y of the eNB. The time stamp of the data packet 1 of the service 1 and the data packet 1 of the service 2 is 10:00:00:000+650 ms=10:00:00:650, and is in the range of the transmission period y, so the data packet 1 of the service 1 and the data packet 1 of the service 2 are transmitted in the transmission period y of the eNB. The eNB multiplexes all data packets in the transmission period y according to a predefined strategy, and transmits the multiplexed data on air resources corresponding to the transmission period y.

A Third Embodiment

An operating and maintaining system configures parameters for a BM-SC, which include the length of a synchronization period and a transmission delay. In this embodiment, the length of the synchronization period is 640 ms, and the transmission delay is 10 ms.

In this embodiment, the BM-SC adds a time stamp to the first data packet of each service, does not add the time stamp to other data packets of the service, but needs to add an Elapsed Octet Counter and a Packet Number to other data packets of the service. Here, the first data packet is the first data packet during the service, if the first data packets of two services are received in the same synchronization period, the BM-SC adds the same time stamp to the first data packets of the two services. In this embodiment, the time stamp of the first data packet exclusively indicates a synchronization period in which the first data packet is received, e.g. a serial number of the synchronization period or absolution time by which the synchronization period can be deduced. The length of the synchronization period of the BM-SC is the same as the length of the transmission period of the eNB, and if the time stamp is a serial number, the serial number range of the synchronization period is the same as the serial number range of the transmission period.

Besides, the BM-SC needs to transmit a control frame which does not include service data to the eNB after data packets of each service in one synchronization period are transmitted, and the control frame includes the number of the data packets of the service transmitted in the synchronization period and the total byte number of the data packets of the service transmitted in the synchronization period. If a certain service has no data to be transmitted in one synchronization period, in the control frame of the service corresponding to the synchronization period, the number of the data packets of the service and the total byte number of the data packets of the service are configured as 0. In this embodiment, in order to avoid that the eNB can not receive the control frame, the BM-SC transmits the control frame for many times, e.g. 3 times or 4 times.

The eNB determines a transmission period to which data packets of each service belong according to the time stamp of the first data packet of the service and the control frame of each synchronization period, and transmits data packets of different services which belong to the same transmission period on air resources corresponding to the transmission period after the data packets of the different services which belong to the same transmission period are multiplexed.

A Fourth Embodiment

An operating and maintaining system configures parameters for a BM-SC, which include the length of a synchronization period and a transmission delay. In this embodiment, the length of the synchronization period is 640 ms, and the transmission delay is 10 ms.

In this embodiment, the BM-SC adds a time stamp to each received data packet, and the time stamp is absolution time at which the data packet is received plus or minus a fixed value, i.e. the time stamp and the absolution time at which the data packet is received have a linearity relation.

The fixed value is 0, or the length of the synchronization period, or the length of a delay time, or the length of the synchronization period plus the length of the delay time.

When the fixed value is the length of the synchronization period plus the length of the delay time, the method for adding the time stamp is the same as the method for adding the time stamp in the prior art.

The eNB may map the received data packets into different transmission periods according an actual value of the time stamp.

Figure 8:
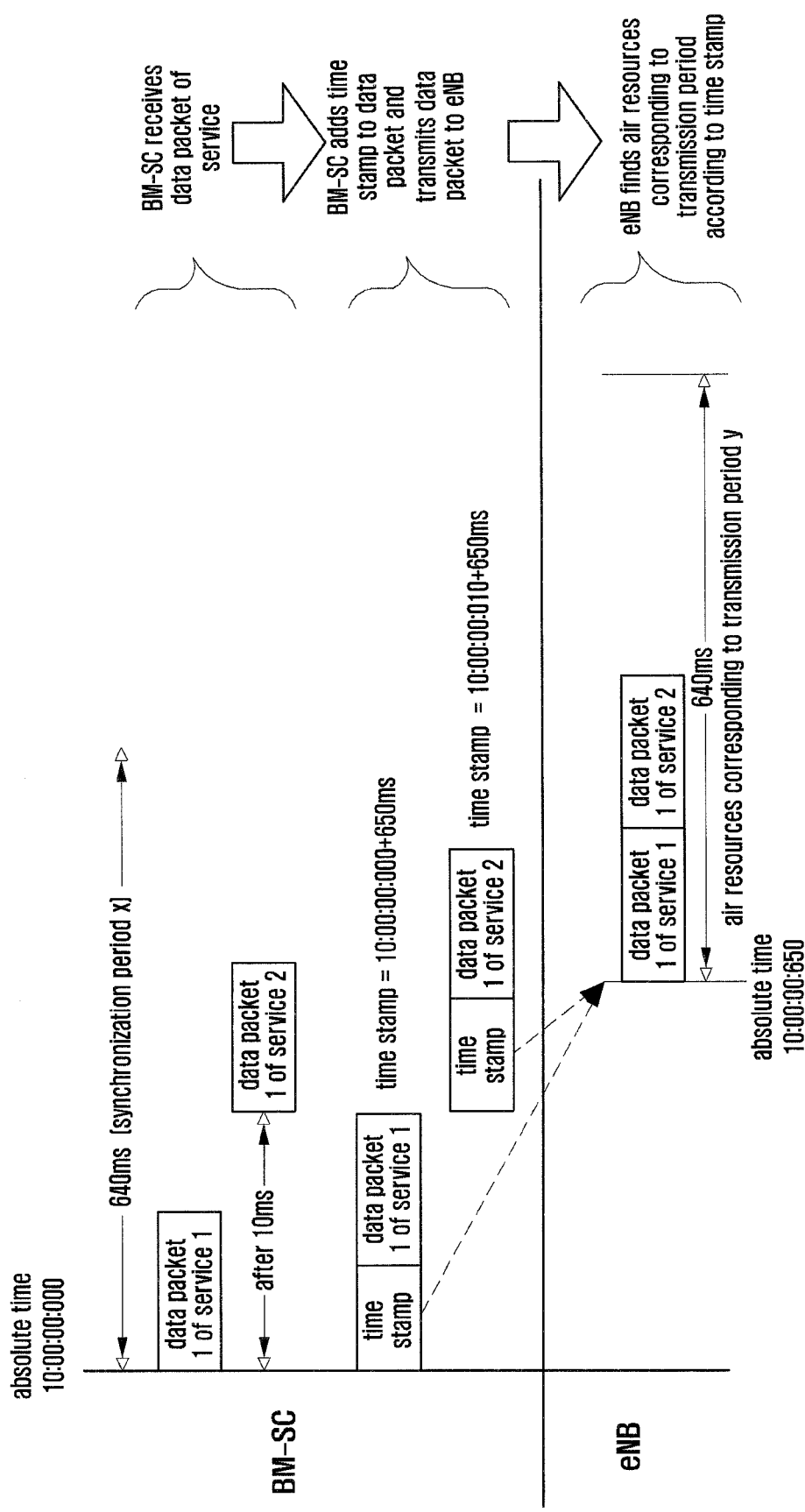
FIG. 8 is a schematic diagram illustrating data packet transmission according to a fourth embodiment of the present invention.

FIG. 8 is a schematic diagram illustrating data packet transmission according to a fourth embodiment of the present invention. Here, this embodiment is described by taking an example that the fixed value is the length of the synchronization period plus the length of the delay time. As shown in FIG. 8, a synchronization period x on the BM-SC starts from absolution time 10:00:00:000, and at the absolution time 10:00:00:000, the BM-SC receives the first data packet of a service 1, called as a data packet 1 of the service 1. A time stamp added to the data packet 1 of the service 1 by the BM-SC is 0:00:00:000+650 ms. After 10 ms, the BM-SC receives the first data packet of a service 2, called as a data packet 1 of the service 2. A time stamp added to the data packet 1 of the service 2 by the BM-SC also is 0:00:00:000+650 ms.

Referring to FIG. 8, when receiving the data packet 1 of the service 1 and the data packet 1 of the service 2, the eNB makes the absolution time indicated by the time stamp correspond to its own transmission period. In this embodiment, the transmission period of the eNB is an MSAP time period, and the length and serial number range of the MSAP time period may be the same as or different from the length and serial number range of the synchronization period of the BM-SC. For example, in this embodiment, the length of the transmission period of the eNB is 640 ms, a transmission period x of the eNB is from 10:00:00:010 to 10:00:00:650, and the next transmission period y is from 10:00:00:650 to 10:00:01:290. The time stamp of the data packet 1 of the service 1, i.e. 10:00:00:000+650 ms=10:00:00:650, and the data packet 1 of the service 2, i.e. 10:00:00:010+650 ms=10:00:00:660, are in the range of the transmission period y, so the data packet 1 of the service 1 and the data packet 1 of the service 2 are transmitted in the transmission period y. The eNB multiplexes all data packets in the transmission period y according to a predefined strategy, and transmits the multiplexed data on air resources corresponding to the transmission period y.

Based on the above embodiments, the present invention provides a structure of a data synchronization system.

Figure 9:
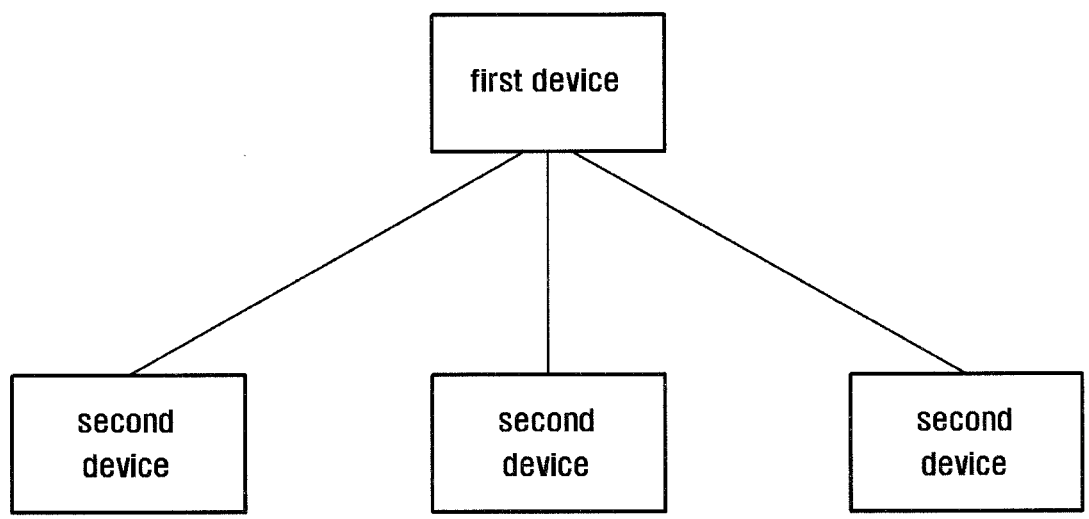
FIG. 9 is a schematic diagram illustrating a data synchronization system according to an embodiment of the present invention.

FIG. 9 is a schematic diagram illustrating a data synchronization system according to an embodiment of the present invention. As shown in FIG. 9, the system includes: a first device and multiple second devices. FIG. 9 shows three second devices, the first device transmits a received data packet to multiple second devices, and the multiple second devices synchronously transmit the same data packet.

In FIG. 9, the first device is adapted to add a time stamp to the received data packet, and transmit the data packet to the second device; and the second device is adapted to determine a transmission period to which the data packet belongs according to the time stamp of the data packet, and transmit data packets of different services which belong to the same transmission period by using air resources corresponding to the transmission period after the data packets of the different services which belong to the same transmission period are multiplexed.

A method for adding the time stamp to the received data packet by the first device in FIG. 9 includes the following modes.

The first device is adapted to add the same time stamp to all data packets received in the same synchronization period, and the time stamp exclusively indicates the synchronization period; the same time stamp is a serial number of the synchronization period, or absolution time at which the first device receives the first data packet in the synchronization period plus or minus a fixed value, or absolution time at which the synchronization period starts plus or minus a fixed value; the fixed value is 0, or the length of the synchronization period, or the length of a delay time, or the length of the synchronization period plus the length of the delay time.

Or, the first device is adapted to add a time stamp to all data packets of the same service received in the same synchronization period, and the time stamp exclusively indicates the synchronization period; for each service, the time stamp is absolution time at which the first device receives the first data packet of the service in the synchronization period plus or minus a fixed value; the fixed value is 0, or the length of the synchronization period, or the length of a delay time, or the length of the synchronization period plus the length of the delay time.

Or, the first device is adapted to add a time stamp to the first data packet of each service, and not add the time stamp to other data packets of the service, and the time stamp exclusively indicates the synchronization period in which the first data packet is received; and adapted to add the same time stamp to the first data packets of different services if the data packets of the different services are received in the same synchronization period. For each service, the first device is adapted to transmit a control frame to the second device after data packets of each service in each synchronization period are transmitted, and the control frame comprises the number of the data packets of the service transmitted in the synchronization period and the total byte number of the data packets of the service transmitted in the synchronization period;

the second device, adapted to determine the transmission period to which the data packets of the service belong according to the time stamp of the first data packet of the service and the control frame of each synchronization period.

Or, the first device is adapted to add a time stamp to each received data packet, and the time stamp is absolute time at which the first device receives the data packet plus or minus a fixed value; the fixed value is 0, or the length of the synchronization period, or the length of a delay time, or the length of the synchronization period plus the length of the delay time.

In FIG. 9, the first device is a multimedia BM-SC, and the second device is an eNB. Of cause, there is an S-GW for forwarding data between the BM-CS and the eNB.

Sum up, in the present invention, the first device adds a time stamp to a received data packet and transmits the data packet to the second device; the second device determines a transmission period to which the data packet belongs according to the time stamp of the data packet, and transmits data packets of different services which belong to the same transmission period by using air resources corresponding to the transmission period after the data packets of different services which belong to the same transmission period are multiplexed according to a predefined strategy. In this way, air resources can be fully utilized.

The foregoing are only preferred embodiments of the present invention and are not for use in limiting the protection scope of the present invention. Any modification, equivalent replacement and improvement made within the spirit and principle of the present invention should be covered under the protection scope of the present invention.

The invention claimed is:

1. A data synchronization method of a second device, the method comprising:

receiving, from a first device, a plurality of first data packets associated with a first service and a plurality of second data packets associated with a second service, at least one of the plurality of first data packets and at least one of the plurality of second data packets being received at the first device during a synchronization period, one of the plurality of first data packets having a first time stamp added by the first device, and one of the plurality of second data packets having a second time stamp added by the first device;

receiving, from the first device, a control frame associated with the synchronization period after the plurality of first data packets and the plurality of second data packets are received from the first device;

determining a transmission period in which to transmit, to a third device, the plurality of first data packets or the plurality of second packets, based on the first time stamp, the second time stamp, and the control frame associated with the synchronization period;

when the first time stamp and the second time stamp are identical and the first service is different from the second service, determining to transmit, to the third device, the plurality of first data packets and the plurality of second packets in a first transmission period;

multiplexing the plurality of first data packets and the plurality of second data packets to generate a signal; and transmitting, to the third device, the signal using air resources corresponding to the first transmission period, wherein the first time stamp or the second time stamp includes an indicator associated with the synchronization period, and wherein the control frame comprises a number of the plurality of first data packets associated with the first service received at the first device during the synchronization period, a total byte number of the plurality of first data packets associated with the first service received at the first device during the synchronization period, a number of the plurality of second data packets associated with the second service received at the first device during the synchronization period, and a total byte number of the plurality of second data packets associated with the second service received at the first device during the synchronization period.

2. The method of claim 1, wherein the first device adds the first time stamp to all of the plurality of first data packets received during the synchronization period, wherein the first device adds the second time stamp to all of the plurality of second data packets received during the synchronization period, wherein the first time stamp and the second time stamp are identical, wherein the indicator associated with the synchronization period is a serial number of the synchronization period, a time associated with when an initial data packet is received after the synchronization period starts plus or minus a fixed value, or a time associated with when the synchronization period starts plus or minus the fixed value, wherein the initial data packet is one of the plurality of the first data packets received during the synchronization period or the plurality of the second data packets received during the synchronization period, and wherein the fixed value is one of 0, the length of the synchronization period, the length of a delay time, or the length of the synchronization period plus the length of the delay time.

3. The method of claim 1,
wherein the first device adds the first time stamp to all of the plurality of first data packets received during the synchronization period; and
wherein the first device adds the second time stamp to all of the plurality of second data packets received during the synchronization period,
wherein the first service is different from the second service,
wherein the first time stamp is different from the second time stamp,
wherein the indicator associated with the synchronization period of the first time stamp is a time associated with when an initial data packet of the plurality of the first data packets is received after the synchronization period starts plus or minus a fixed value,
wherein the indicator associated with the synchronization period of the second time stamp is a time associated with when an initial data packet of the plurality of the second data packets is received after the synchronization period starts plus or minus a fixed value, and
wherein the fixed value is one of 0, the length of the synchronization period, the length of a delay time, or the length of the synchronization period plus the length of the delay time.

4. The method of claim 1,
wherein the first device is a multimedia Broadcast Multicast Service Center (BM-SC),
wherein the second device is an evolved Node B (eNB), and
wherein the third device is a user equipment (UE).

5. A second data synchronization device, the device comprising:
a transmitter configured to transmit signals;
a receiver configured to receive signals; and
a controller configured to:
receive, from a first device, a plurality of first data packets associated with a first service and a plurality of second data packets associated with a second service, at least one of the plurality of first data packets and at least one of the plurality of second data packets being received at the first device during a synchronization period, one of the plurality of first data packets having a first time stamp added by the first device, and one of the plurality of second data packets having a second time stamp added by the first device,
receive, from the first device, a control frame associated with the synchronization period after the plurality of first data packets and the plurality of second data packets are received from the first device,
determine a transmission period in which to transmit, to a third device, the plurality of first data packets or the plurality of second packets, based on the first time stamp, the second time stamp, and the control frame associated with the synchronization period,
when the first time stamp and the second time stamp are identical and the first service is different from the second service, determine to transmit, to the third device, the plurality of first data packets and the plurality of second packets in a first transmission period,
multiplex the plurality of first data packets and the plurality of second data packets to generate a signal, and
transmit, to the third device, the signal using air resources corresponding to the first transmission period,
wherein the first time stamp or the second time stamp includes an indicator associated with the synchronization period, and
wherein the control frame comprises a number of the plurality of first data packets associated with the first service received at the first device during the synchronization period, a total byte number of the plurality of first data packets associated with the first service received at the first device during the synchronization period, a number of the plurality of second data packets associated with the second service received at the first device during the synchronization period, and a total byte number of the plurality of second data packets associated with the second service received at the first device during the synchronization period.

6. The device of claim 5,
wherein the first device adds the first time stamp to all of the plurality of first data packets received during the synchronization period,
wherein the first device adds the second time stamp to all of the plurality of second data packets received during the synchronization period,
wherein the first time stamp and the second time stamp are identical,
wherein the indicator associated with the synchronization period is a serial number of the synchronization period, a time associated with when an initial data packet is received after the synchronization period starts plus or minus a fixed value, or a time associated with when the synchronization period starts plus or minus the fixed value,
wherein the initial data packet is one of the plurality of the first data packets received during the synchronization period or the plurality of the second data packets received during the synchronization period, and
wherein the fixed value is one of 0, the length of the synchronization period, the length of a delay time, or the length of the synchronization period plus the length of the delay time.

7. The device of claim 5,
wherein the first device adds the first time stamp to all of the plurality of first data packets received during the synchronization period, and
wherein the first device adds the second time stamp to all of the plurality of second data packets received during the synchronization period,
wherein the first service is different from the second service,
wherein the first time stamp is different from the second time stamp,
wherein the indicator associated with the synchronization period of the first time stamp is a time associated with when an initial data packet of the plurality of the first data packets is received after the synchronization period starts plus or minus a fixed value,
wherein the indicator associated with the synchronization period of the second time stamp is a time associated with when an initial data packet of the plurality of the second data packets is received after the synchronization period starts plus or minus a fixed value, and
wherein the fixed value is one of 0, the length of the synchronization period, the length of a delay time, or the length of the synchronization period plus the length of the delay time.

8. The device of claim 5,
wherein the first device is a multimedia Broadcast Multicast Service Center (BM-SC),
wherein the second data synchronization device is an evolved Node B (eNB), and
wherein the third device is a user equipment (UE).

\* \* \* \* \*